Nov. 4, 1969　　　　　M. J. ROTHMAN　　　　　3,476,927
PORTABLE ILLUMINATED MIRROR
Filed Jan. 9, 1967　　　　　　　　　　　　　2 Sheets-Sheet 1
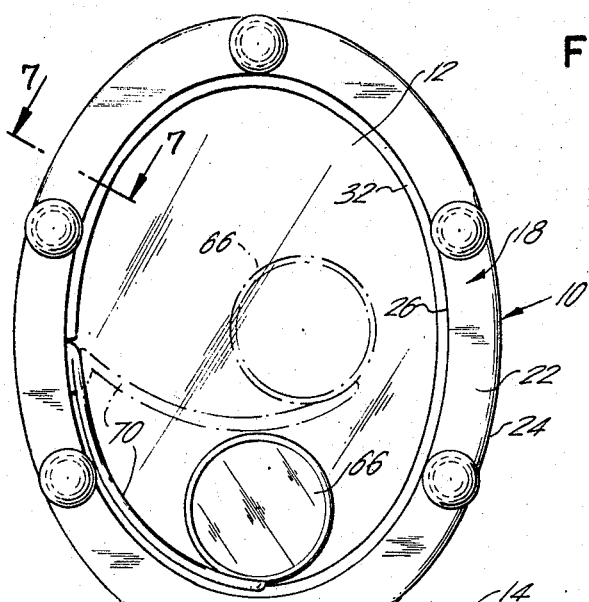
FIG.1
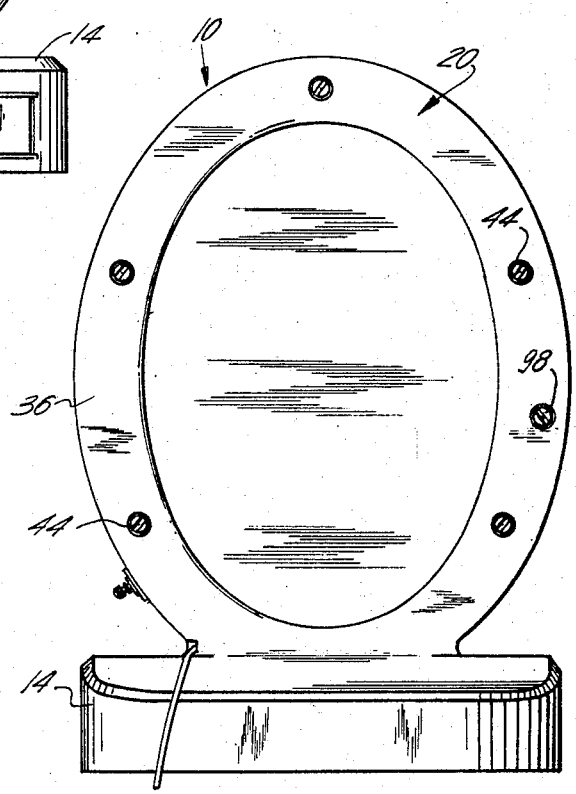
FIG.2
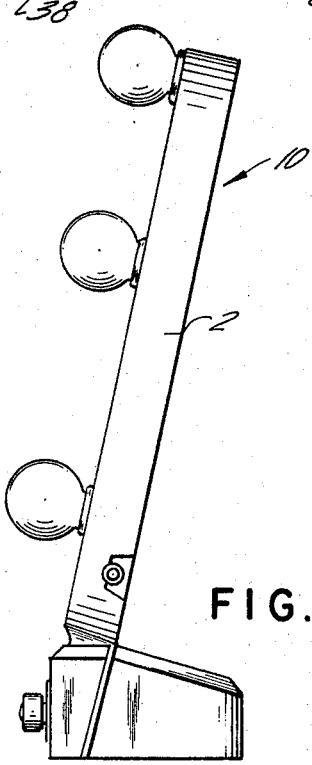
FIG.3
INVENTOR.
MATTHEW J. ROTHMAN
BY
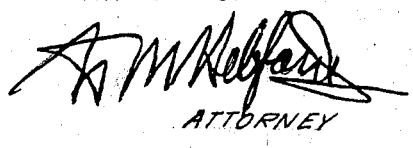
ATTORNEY

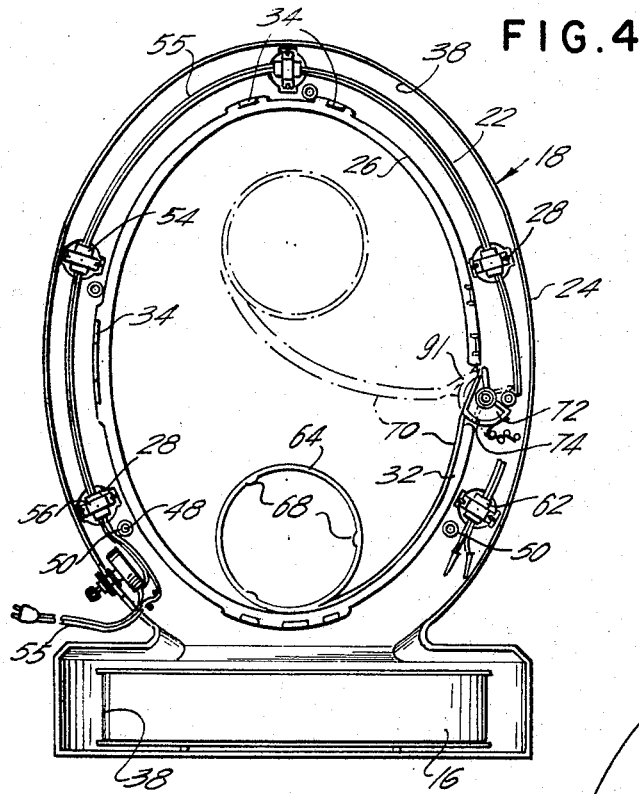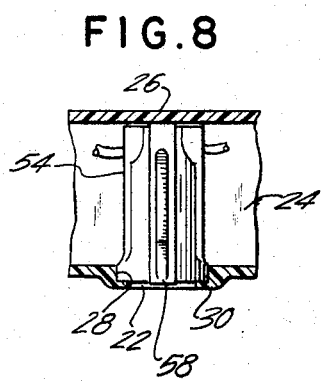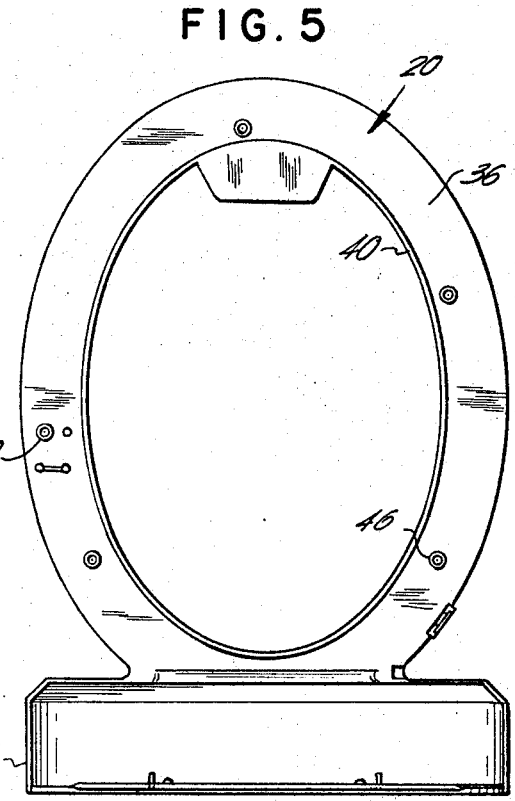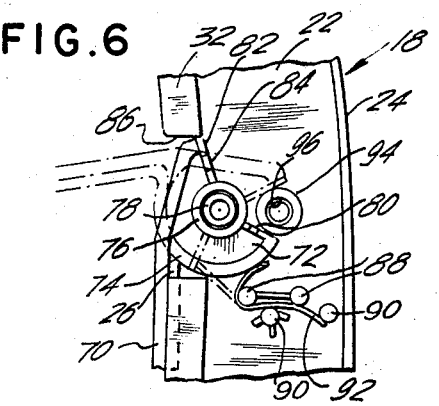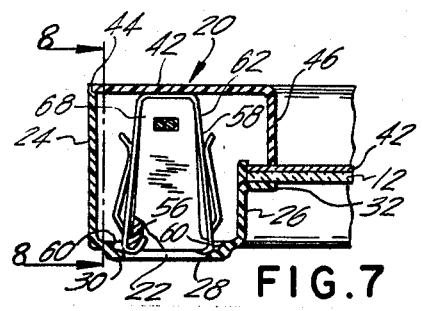

United States Patent Office 3,476,927
Patented Nov. 4, 1969

3,476,927
PORTABLE ILLUMINATED MIRROR
Mattthew J. Rothman, Great Neck, N.Y.
(140–35 Beech Ave., Flushing, N.Y. 11355)
Filed Jan. 9, 1967, Ser. No. 613,381
Int. Cl. F21v 33/00
U.S. Cl. 240—4.2
12 Claims

ABSTRACT OF THE DISCLOSURE

A portable illuminated mirror including a hollow frame composed of two annular sections each provided with a complementary base section, one of said sections channel-shaped, one of said sections provided with openings for electric light bulbs; a planar reflector member and electric light sockets clamped in place between said frame sections; and a magnifying reflector at the end of an arm is held against the reflecting side of said reflector; the other end of the arm is pivoted within the frame for movement between an upper and a lower position, with resilient means engaging the pivoted arm end for maintaining the magnifying reflector in upper position.

---

The present invention relates to a portable, tabletop makeup mirror and, more particularly, to an illuminated portable, tabletop makeup mirror, and has for its general object the provision of a mirror, of the character described, which is of highly simplified construction, simple and easy to assemble, and, therefore, economical to produce.

It is a particular object of the present invention to provide a mirror, of the character described, which provides for the magnification of reflected portions of a face that require particular attention when making up, such as lips, eyebrows, and eyelashes, without the conventional provision of a reversible mirror that has a concave reflecting surface on one side.

It is another object of the present invention to provide a mirror, of the character described, in which the means for magnifying a portion of the face is adjustable, so as to make possible the magnification of face portions on different levels without the need for moving the head, as well as to dispose the magnified portion of the face in proper relation to the unmagnified reflection of the remainder of the face.

The foregoing and other objects and advantages of the portable, tabletop, makeup mirror of the present invention will become more readily apparent to those skilled in the art from the embodiments thereof shown in the accompanying drawing, and from the description following. It is to be understood, however, that such embodiments are shown by way of illustration only, to make the principles and practice of the invention more readily comprehensible, and without any intent of limiting the invention to the specific details therein shown.

In the drawings:

FIG. 1 is a front elevation of an assembled makeup mirror of the present invention; the dotted lines indicating an alternate position of the magnifying reflector of the mirror;

FIG. 2 is a rear elevation of the same;

FIG. 3 is a side elevation of the same;

FIG. 4 is a rear elevational view of the front frame section of the mirror;

FIG. 5 is a front elevational view of the rear frame section of the mirror;

FIG. 6 is a fragmentary, rear elevational view, on an enlarged scale, of the magnifying mirror mounting and positioning means;

FIG. 7 is a section taken on line 7—7 of FIG. 1; and

FIG. 8 is a section taken on line 8—8 of FIG. 7.

Referring now, in greater detail, to the embodiment of the invention illustrated in the drawing, the same is shown to comprise a hollow frame, generally designated as 10, supporting a reflector, such as a glass mirror 12, and mounted on a base 14, which is preferably hollow and receives the drawer 16; the frame being preferably supported in rearwardly tilted position. The frame 10 is preferably molded from a synthetic plastic material.

The frame 10 is formed in two parts; namely, a front frame section, generally designated as 18, and a rear frame section, generally designated as 20. The front frame section 18 is preferably integral with the front base section 14a, and is of approximately channel or U-shape cross-section that opens to the rear and includes the web portion, 22, the outer side wall, 24, and the inner side wall, 26, which is preferably relatively lower than the outer side wall 24. The web portion 22 is formed with a plurality of spaced openings 28 that are defined on the outer surface of the web section by an inwardly facing, L-shaped flange projection 30 providing a rabbet-like formation at the edge of the opening 28. The inner wall section 26 of frame section 18 is formed with a flange 32 extending laterally over the opening defined thereby, adapted to support, by its edge portion, the glass reflector or mirror 12; the latter being retained against lateral displacement by upstanding lugs, 34, spaced around the outer periphery of flange 32.

The rear frame section 20 is shown to comprise a flat, annular body 36, whose outer circumference is adapted to fit snugly within a rabbet 38 formed in the inner corner of the edge of the outer wall section 24, and its inner edge portion is formed with a downwardly extending flange 40 arranged to register with the flange 32 of frame wall 26, when the rear wall section 20 is assembled therewith; the flange 40 being of a height to impinge against a yieldable backing 42 that may be placed over the mirror 12 resting on flange 32.

Frame section 20 may be integrally molded with base portion 14b which, when the two frame sections are assembled, will have its forward edge register with the rear edge of base section 14a to complete the base as well as the receiving recess for the drawer 16.

The front and rear frame sections 18 and 20 may be assembled together by means of screws 44, that are inserted through openings 46 formed in frame section 20 and are engaged in openings 48, provided in posts 50, provided on web 22 of frame section 18 to register with the openings 46.

The illumination for the mirror is provided by a chain of sockets 54 connected by the electrical conduit 56 disposed within the frame 10. The sockets 54 have the outer insulating wall 56, whose opening is of a size that the edge thereof will frictionally fit within an opening 28 in the web 22 of frame section 18. Each socket 54 is of a height that when the edge of its outer wall 56 is disposed on flange 30 of an opening 28, its other end, which is closed and preferably flat, will be engaged by the flat annular body 36 of frame section 20, when the latter is screwed in place on the front frame section 18 to thereby retain the sockets 54 firmly in place within the hollow interior of frame 10 against tilting and displacement.

To prevent rotational displacement of the sockets 54 in the openings 28 when a light bulb is screwed thereinto, such sockets may be of the type illustrated, namely, one having a metal band 58, extend across its closed ends and along its sides, with the ends of the bands engaged over the edge of the opening in the insulated wall 56 to form diametrically opposed external projections on the open end of the socket. These projections may be received in the debossed recesses 60, formed in diametrically opposed relation in the web 22 of frame section 18, extending radially outwardly from each opening 28, whose sides will engage such projections to inhibit rotational displacements of the sockets within the openings 28.

The magnifying reflector of the illuminated mirror of the present invention may comprise a relatively small, preferably circular, preferably molded frame, 64, in which is set a concave glass mirror 66, held in place by any suitable conventional means, as by lugs 68, on the rear face of the frame 64. Frame 64 is connected, preferably integrally to one end of an arm 70, which is preferably curved in conformity with the curvature of the lower portion of the opening of frame 10. The arm 70 has extending downwardly from its other end a wing portion 72, having an arcuate, preferably downwardly facing bottom edge, preferably provided with a widened flange 74. Extending rearwardly from wing 72 is a tubular sleeve 76 adapted to fit over and pivot on post 78 set on the web 22 of frame section 18. Sleeve 76 may have vanes 80 and 82 at its edge facing the interior of the frame 10, which extend rearwardly at a slightly convergent angle to one another; the lower of the vanes 80 defining the inner edge of wing 72. Vanes 80 and 82 may be coextensive in height with sleeve 76, which may be slightly less than the depth of the frame interior, and may be provided with rearwardly extending lugs on their rear edges of a height to be engaged by the rear frame section 20, when the latter is in position on the frame.

The frame 64 of the magnifying mirror and its arm are arranged to be disposed against the inner surface of the flange 32 when in lowermost position. To that end, the inner side wall 26 of frame section 18 is cut away, as at 86, adjacent to the post 78, to permit the free end of arm 70 and the wing 72 to rest against the inner surface of web 22 of the frame section 18. The inner side wall 26 of such frame section serves to support the magnifying mirror frame when in lowermost position, in which position it may be desirable to retain it for the purpose of attending to the lower portion of the face, as when applying coloring to the lips.

The magnifying mirror frame 64 may be swung upwardly, as indicated in FIGS. 1 and 4, for attending to the upper portion of the face, as when taking care of eyebrows and eyelashes, and means may be provided for retaining the magnifying mirror in such upper position. Such means may comprise a pair of spaced lugs 88 on the inner face of the web 22 and another pair of spaced lugs 90 in offset relation and parallel to lugs 88. An approximately L-shaped leaf spring 92 has one leg thereof held between lugs 88 and 90, with its other leg inwardly extending to engage against arcuate flange 74 of wing 72, when the magnifying mirror is in lowermost position, and to engage against the surface of the lower of the vanes 80 when in uppermost position, to thereby retain the magnifying mirror in such upper position, as indicated in broken lines in FIGS. 1, 4 and 6, until manually moved back to lower position.

To insure that the magnifying mirror is positioned flatly against the main mirror 12 and that it does not automatically drop, by its own weight, from uppermost to lower position, there is provided within frame section 18, adjacent to and outwardly of post 76, a second post 94 of a height slightly less than the depth of frame 10, formed with an opening 96 in its free end, which is adapted to receive a pressure adjusting screw 98 passed through a registering opening provided in body 36 of frame section 20. A turning of the screw 98 will increase the pressure of the body 36 on lugs 84 of vanes 80 and 82 to press wing 72 and sleeve 76 against web 22 and tilt frame 70 against or toward mirror 12. Such pressure adjustment will also exert friction on lugs 84 to inhibit the inadvertent dropping of the magnifying mirror from upper to lower position.

This completes the description of the portable illuminated makeup mirror of the present invention. It will be readily apparent that such mirror is of highly simplified construction; being formed of a minimum of parts that may be mass produced and that may be rapidly and easily assembled, and that it may, therefore, be produced at relatively low cost. It will also be apparent that the mirror of the invention is strong and durable, with light sockets that will stay in place, without shifting or rotating. It will likewise be apparent that, through the mirror of the invention is not reversible, it provides, nevertheless means for magnifying different, selected portions of the face, that are easily adjustable for the purpose and remain in adjusted position. It will likewise be apparent that the mirror of the invention is generally desirable and convenient to use.

It will be further apparent that numerous modifications and variations may be made in the portable illuminated mirror of the present invention, in accordance with the priniciples of the invention hereinabove set forth and without the exercise of any inventive ingenuity. I desire, therefore to be protected for any and all such modifications and variations that may be made within the spirit of the invention and the scope of the claims hereto appended.

What I claim is:

1. A portable illuminated mirror, of the character described, comprising a hollow frame, said frame including a pair of annular frame sections, one of said sections being of channel shape, one of said sections having a plurality of spaced, electric lamp-admitting openings, a reflector disposed between the inner edges of said annular frame sections, means securing said frame sections to one another to grip said reflector between them, a plurality of electric light sockets disposed within said hollow frame, in substantially perpendicular relation to said frame sections, each of said sockets having the edge of its outer wall defining its lamp-receiving opening disposed on the edge of one of said electric light lamp-admitting openings, said sockets being of a height equal substantially to the distance between the edges of said electric light lamp receiving openings in said last-named one frame section to the other of said frame sections, whereby said sockets are retained in position between said frame sections when secured to one another.

2. The mirror of claim 1, wherein said hollow frame is provided with a hollow base adapted to receive a drawer, each said frame section having a section of said base connected thereto.

3. The mirror of claim 1, wherein cooperating means are provided on said sockets and said frame interengaging said sockets and said frame against rotation of said sockets within said frame.

4. The mirror of claim 3, wherein said cooperating means on said frame are provided on said last named one section.

5. The mirror of claim 1, wherein each said electric light admitting opening is formed with a rabbet at its inner edge, said rabbet frictionally receiving the marginal edge portion of the outer socket wall at its electric light receiving opening.

6. The mirror of claim 5, wherein projections are provided on said outer socket wall at its said marginal edge portions and means are provided on said last named one section adjacent said electric light receiving openings engaging said projections.

7. The mirror of claim 1, wherein said channel shaped section is formed with an inner side wall of lesser height than the outer side wall thereof, said inner side wall formed with a laterally and inwardly extending flange, and said other frame section is formed with a flange at its inner edge normal to said flange on said inner side wall and registering therewith and terminating short thereof, and the said reflector is engaged between said flanges.

8. The mirror of claim 7, wherein said electric light receiving openings are formed in the web portion of said channel shaped frame section.

9. The mirror of claim 1, wherein a magnifying reflector of relatively lesser area than said first named reflector is disposed flatly over said first named reflector.

10. The mirror of claim 9, wherein means are provided for supporting said magnifying reflector for adjustable movement over said main, first named reflector.

11. The mirror of claim 10, wherein said supporting means for said magnifying reflector comprises a frame for said magnifying reflector, an arm connected by one end to said frame, the other end of said arm extending into said hollow frame, and means provided in said frame for pivotally supporting said other end of said arm.

12. The mirror of claim 11, wherein said magnifying reflector is movable from a lower to an upper position over said first named reflector; said magnifying reflector resting on said hollow frame when in lower position and means are provided for resiliently engaging said other end of said arm to retain it in upper position.

References Cited

UNITED STATES PATENTS

| 2,026,009 | 12/1935 | Ritz-Woller | 240—4.2 |
| 2,200,114 | 5/1940 | Konikoff | 240—4.2 |
| 3,268,715 | 8/1966 | Rothman | 240—4.2 |
| 3,381,119 | 4/1968 | Brickman et al. | 240—4.2 |
| 3,381,120 | 4/1968 | Fleisher et al. | 240—6.45 XR |

NORTON ANSHER, Primary Examiner

ROBERT P. GREINER, Assistant Examiner

U.S. Cl. X.R.

350—296